Feb. 16, 1926. 1,572,951
R. T. PIERCE
RELAY TRIPPING SYSTEM
Filed Nov. 5, 1923
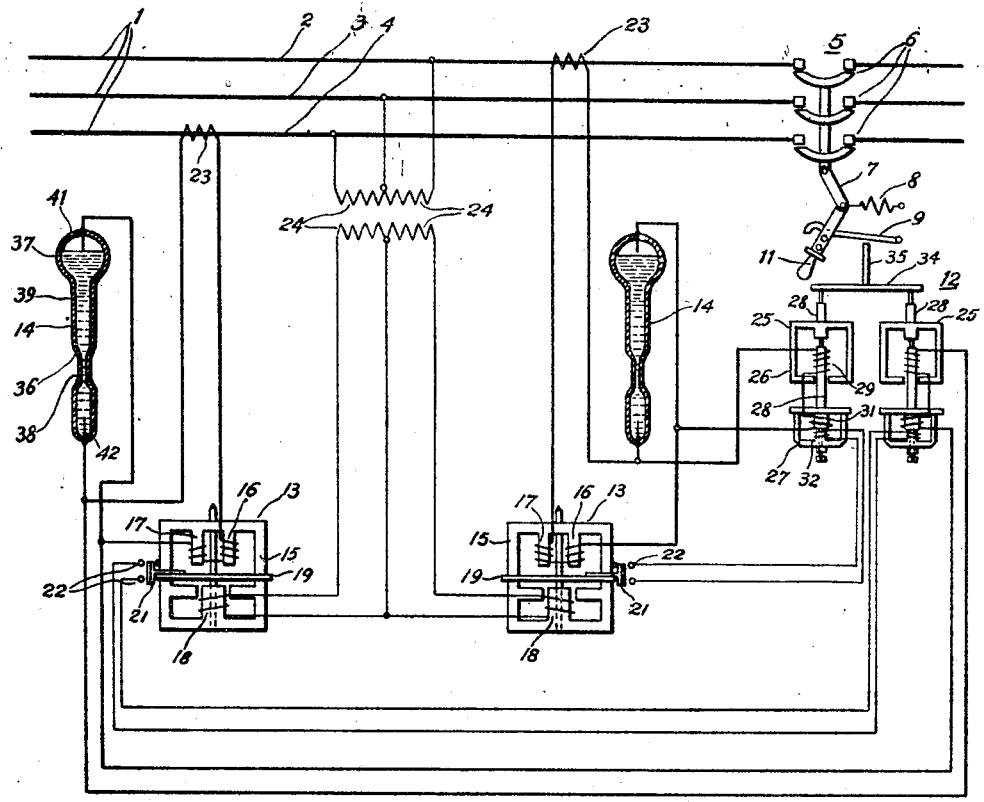
WITNESSES:
INVENTOR
Raymond T. Pierce
BY
ATTORNEY Patented Feb. 16, 1926.

1,572,951

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

RELAY-TRIPPING SYSTEM.

Application filed November 5, 1923. Serial No. 672,884.

*To all whom it may concern:*

Be it known that I, RAYMOND T. PIERCE, a citizen of the United States, and a resident of East Pittsburgh, in the county of Allegheny and State of Pennsylvania, have invented a new and useful Improvement in Relay-Tripping Systems, of which the following is a specification.

My invention relates to relays and more particularly to reverse-power relays.

One object of my invention is to provide a direct-trip relay that shall operate when an overload traverses the circuit at the same time that the power reverses in the circuit.

Another object of my invention is to provide a relay, of the above-indicated character, that shall be operated at the end of a time interval after the reversal of power in the circuit depending upon the value of the overload.

In carrying out my invention, I provide a circuit interrupter for an alternating-current polyphase circuit and a tripping device therefor that is energized directly from the circuit. A reverse-power relay is provided having its current winding connected in series with the windings of the tripping device. A time-limit overload-responsive device is connected in shunt to the windings of the tripping device in such manner that it normally shunts sufficient current from the windings of the tripping device to render it inoperative. When an excessively heavy current traverses the polyphase circuit for a period of time, the shunt circuit across the windings of the tripping device will be opened and the windings of the tripping device will be energized. The interrupter will not be tripped, however, until the reverse-power relay operates to short-circuit a normally open-circuit winding on the tripping device. When this winding is short-circuited, it neutralizes the effect of one of the windings of the tripping device and permits the other winding to actuate the same to trip the interrupter.

The single figure of the accompanying drawings is a diagrammatic view of electrical circuits and apparatus embodying my invention.

A three-phase electrical circuit 1 having a plurality of conductors 2, 3 and 4 is provided with a circuit interrupter 5. The circuit interrupter 5 comprises a plurality of bridging members 6 for the several conductors of the three-phase circuit 1, an operating mechanism 7, a tripping spring 8, a latch 9, an operating handle 11 and a tripping device 12.

A pair of reverse-power relays 13 of the induction type are operatively connected to the circuit and the current windings thereof are connected in series with certain windings of the tripping mechanism 12. A time-limit overload-responsive device 14 is connected in shunt to the windings of the tripping mechanism 12 of the circuit interrupter 5.

Each of the reverse-power relays 13 comprises a frame or core member 15 having pole pieces 16, 17 and 18. A disc member 19 is pivotally mounted for rotation between the pole pieces 16 and 17 and the pole piece 18. The disc member 19 carries a bridging contact member 21 for co-operation with a pair of stationary contact members 22 under conditions hereinafter described.

The pole pieces 16 and 17 are provided with oppositely-wound series-connected windings that are, in turn, energized from current transformers 23 that are connected to the several conductors of the three-phase circuit 1. The pole pieces 18 are provided with windings which are energized from voltage transformers 24 that are connected across the different phases of the three-phase circuit 1. The magnetic relation between the disc 19 and the several pole pieces 16, 17 and 18 is such that the disc member is normally turned in such direction as to engage a stop member to thus maintain the contact members 21 and 22 out of engagement.

The tripping device 12 of the circuit interrupter 5 comprises a plurality of similar units 25, one of which is connected in circuit with each of the current windings of the reverse-power relays 13. Each of the units 25 comprises a pair of core members 26 and 27 between the pole of which a common plunger 28 is adapted to move. A coil or winding 29 loosely surrounds the plunger 28 within the core member 26 while a coil or winding 31, which is connected in series with the coil 29, loosely surrounds the plunger 28 within the core member 27. A third coil or winding 32 surrounds the core member 27 adjacent to the coil 31 and is normally open-circuited at the contact members 21 and 22 of the relay 31.

The plungers 28, of the several tripping elements 25, are disposed so as to engage a common lever 34 which is provided with a plunger 35 for actuating the latch 9 of the circuit interrupter 5. The coils 29 are of a larger number of turns than the coils 31 with which they are in series relation. However, the magnetic reluctance defined by the core members 26 and the plungers 28 adjacent to the coils 29 is sufficiently greater than the reluctance defined by the core members 27 and the plungers 28 adjacent to the coils 31 to compensate for their difference in turns in the coils 29 and 31 and the plungers 28 normally remain seated against the lower portion of the core members 27 when the windings 29 and 31 are energized. This form of tripping device, which forms no part of the present invention except as it is used in connection therewith, is shown and described in the patent to B. H. Smith, No. 1,321,659, issued July 3, 1917, which is assigned to the Westinghouse Electric and Manufacturing Company.

The overload-responsive device 14 comprises a hollow receptacle 36 which is provided with an enlarged portion 37 at one end and an intermediate portion 38 of reduced cross-sectional area. The hollow receptacle 36 is filled with a conducting fluid, 39, such as mercury, into which extend conductors 41 and 42 that are sealed through the walls of the receptacle 36. Each of the overload-responsive devices 14 are connected in shunt relation to the series-connected coils 29 and 31 of a unit 25.

In the normal operation of the three-phase transmission line 1, the current traversing the current transformers 23, divides, the major portion traversing the overload-responsive devices 14 and the current windings of the relay 13 and a very small portion traversing the coils 29 and 31 of one of the tripping units 25.

So long as the power traversing the three-phase circuit 1 remains in its normal direction in the circuit, the relay 13 retains its contact members 21 and 22 disengaged, although a certain amount of heating action takes place in the fluid 39 of the overload-responsive device 14. As soon as the power traversing the circuit 1 reverses, the windings on the core member 15 are so energized that the disc 19 is reversed in its direction of movement and the bridging member 21 engages the contact members 22 to complete a circuit through the winding 32 of the device 25. The coil 32 thereupon acts as a short-circuited secondary coil for a transformer of which the coil 31 is the primary winding and the plunger 28 is the core member. This causes the effect of the winding 31 to be neutralized.

However, the proportion of the current traversing the coils 29 and 31 is relatively small when compared with that portion of the current traversing the overload-responsive device 14. Under these conditions, the coil 29 is not sufficiently energized to raise the plunger 28 even though the effect of the coil 31 is neutralized by the inductive reaction of the coil 32. This condition continues until the current traversing the overload-responsive device 14 reaches a point, or has existed for such period of time, that its heating effect is such as to cause that part of the fluid 39 in the portion 38 of reduced cross-sectional area to become volatilized with a resultant interruption of the current traversing the fluid 39.

Simultaneously with the interruption of the current traversing the overload-responsive device 14, the current traversing the coils 29 and 31 in parallel circuit therewith is correspondingly increased. This increase in current value is sufficiently great to enable the coil 29 to overcome the weakened holding effect of the coil 31 and the plunger 28 is moved upwardly in such manner as to result in the engagement of the latch 9 by the plunger 35. Upon the release of the latch member 9, the circuit interrupter 5 is actuated to its circuit interrupting position by the spring 8.

Upon the interruption of the circuit 1 by the circuit interrupter 5, the current transformer 23 becomes de-energized and the fluid 39 returns to its normal temperature thereby restoring the circuit therethrough. At the same time, the reverse-power relays 13 return to their normal position.

In the event that an excessive current traverses the overload-responsive device 14 when the power is traversing the circuit in the normal direction and the circuit at the portion 38 of restricted cross-sectional area becomes interrupted, the circuit interrupter 5 is not operated. Under such conditions, the increase in the current traversing the coils 29 and 31 is not sufficient to enable the coil 20 to overcome the holding effect of coil 31 for the reason that the coil 32 remains open-circuited and, therefore, has no effect in reducing the effective magnetic field of the coil 31.

It will thus be seen that I have provided a time element for reverse-power relays which operates only when a reversal in the direction of power in an alternating-current circuit takes place and then only an interval of time after the current has reached a definite magnitude.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with an alternating-current power-directional relay, of a circuit interrupter controlled thereby, direct-trip means for said interrupter and means including a time-limit relay co-operating with the tripping means for delaying the action of said circuit interrupter under conditions of reversed power.

2. The combination with a power-directional relay, of a circuit interrupter controlled thereby, and means for delaying the operation of said circuit interrupter until the heating effect of the reversed power reaches a predetermined value.

3. The combination with a power-directional relay, of a circuit interrupter controlled thereby, direct-trip means for said interrupter, and a thermal-responsive element cooperating with said tripping means for delaying the operation of said circuit interrupter under conditions of reversed power.

4. The combination with a power-directional relay, of a circuit interrupter controlled thereby, and a thermal-responsive element in circuit with said relay for delaying the operation of said circuit interrupter under conditions of reversed power.

5. The combination with a power-directional relay, of a circuit interrupter controlled thereby, and an overload-responsive device in parallel circuit with said relay for delaying the operation of said circuit interrupter under conditions of reversed power.

6. The combination with a power-directional relay, of a circuit interrupter controlled thereby, and a fluid overload-responsive device in circuit with said relay for delaying the operation of said circuit interrupter under conditions of reversed power.

7. The combination with a power-directional relay, of a circuit interrupter controlled thereby, and a mercury tube in parallel circuit with said relay for delaying the operation of said circuit interrupter under conditions of reversed power.

8. The combination with a power-directional relay having a pair of relatively movable contact members controlled thereby, of a circuit interrupter having a plurality of operating coils normally in magnetic balance, certain of said operating coils being in circuit with said relay, and another of said operating coils being controlled by said relatively movable contact members.

9. The combination with a power-directional relay having a current winding, and a pair of relatively movable contact members controlled thereby, of a circuit interrupter having a plurality of operating coils normally in magnetic balance, certain of said operating coils being in circuit with said relay winding, and another of said operating coils being controlled by said relatively movable contact members, whereby said circuit interrupter is operated only upon the occurrence of a predetermined power reversal.

10. The combination with a polyphase transmission line, and a plurality of power-directional relays in different phases of said transmission line, of a circuit interrupter, a multi-element controlling device therefor and a plurality of thermo-responsive elements, each of said relays being in circuit with at least one of said controlling elements and a thermo-responsive element.

11. The combination with a polyphase transmission line, and a plurality of power-directional relays in different phases of said transmission line, of a circuit interrupter, a multi-element controlling device therefor and a plurality of thermo-responsive elements, each of said relays being in circuit with at least one of said thermal elements and an element of said controlling device.

12. The combination with a polyphase transmission line, and a plurality of power-directional relays therefor, said relays being connected to different phases of said transmission line, of a circuit interrupter, a tripping device comprising a plurality of controlling windings therefor and a plurality of thermo-responsive devices, each of said relays being in circuit with at least one of said controlling windings and a thermo-responsive device whereby said circuit interrupter is operated upon the occurrence of a power reversal of a predetermined magnitude in any phase of said transmission line.

13. In an electrical device, a source of electro-motive-force, a circuit-interrupter controlling means, a time-limit overload-responsive device in shunt circuit with the controlling means, and means responsive to electrical conditions in the source of electromotive-force for completing a circuit from the source of electromotive-force to the overload-responsive device and the controlling means whereby the controlling means is incompletely energized until the overload-responsive device operates.

14. The combination with an electrical circuit a current transformer connected thereto, and a circuit interrupter therefor, of a circuit-interrupter controlling means, a time-limit overload-responsive device in shunt circuit with the controlling means, and a relay responsive to conditions in the electrical circuit for completing a circuit from the current transformer to the overload device and controlling means, whereby the controlling means is incompletely energized until the overload-responsive device operates.

15. The combination with a polyphase transmission line and a circuit-interrupter in said line, of a reverse-energy relay having current and voltage windings connected to said line, a thermal-responsive circuit-opening device in series with said current winding and direct-tripping means for said circuit-interrupter controlled jointly by said relay and circuit-opening device.

16. The combination with a polyphase transmission line and a circuit-interrupter in said line, of a reverse-energy relay having current and voltage windings connected to said line, a thermal-responsive circuit-opening device in series with said current winding and a direct-trip magnet for said circuit-interrupter having two spaced windings normally short-circuited by said thermal-responsive device and a third winding adjacent one of said spaced windings and controlled by said relay.

In testimony whereof, I have hereunto subscribed my name this 29th day of October, 1923.

RAYMOND T. PIERCE.